US009587450B2

(12) United States Patent
Behrens

(10) Patent No.: US 9,587,450 B2
(45) Date of Patent: Mar. 7, 2017

(54) INJECTOR HEAD TILT MECHANISM

(71) Applicant: Premier Coil Solutions, Inc., Waller, TX (US)

(72) Inventor: Randall Dean Behrens, Sealy, TX (US)

(73) Assignee: Premier Coil Solutions, Inc., Waller, TX (US)

( * ) Notice: Subject to any disclaimer, the term of this patent is extended or adjusted under 35 U.S.C. 154(b) by 260 days.

(21) Appl. No.: 14/454,948

(22) Filed: Aug. 8, 2014

(65) Prior Publication Data

US 2016/0040488 A1 Feb. 11, 2016

(51) Int. Cl.
*E21B 7/02* (2006.01)
*E21B 19/22* (2006.01)
*F16M 11/20* (2006.01)

(52) U.S. Cl.
CPC ......... *E21B 19/22* (2013.01); *F16M 11/2021* (2013.01)

(58) Field of Classification Search
CPC ........ B60P 1/045; B65G 69/2823; B66F 7/08; B66F 7/0641; B66F 11/042; B66F 7/0691; B66F 1/025; B66F 7/22; E21B 15/00; E21B 7/023; E21B 7/02; E21B 15/003
See application file for complete search history.

(56) References Cited

U.S. PATENT DOCUMENTS

| 3,705,634 | A | * | 12/1972 | Casagrande | ............. | E02D 7/16 173/28 |
| 4,673,035 | A | | 6/1987 | Gipson | | |
| 5,244,046 | A | | 9/1993 | Council et al. | | |
| 5,377,482 | A | * | 1/1995 | Knigge | .............. | A01D 78/1007 56/367 |
| 5,839,514 | A | | 11/1998 | Gipson | | |
| 6,209,944 | B1 | | 4/2001 | Billiu et al. | | |
| 7,708,058 | B1 | * | 5/2010 | Gipson | ................... | E21B 19/22 166/77.1 |
| 7,748,471 | B2 | * | 7/2010 | Osadchuk | ................. | E21B 7/02 173/28 |
| 8,161,589 | B1 | * | 4/2012 | Heffernan | .......... | B65G 69/2829 14/71.3 |

(Continued)

FOREIGN PATENT DOCUMENTS

CN 202117595 U 1/2012
WO 2008068546 A1 6/2008

OTHER PUBLICATIONS

Baycor International Home, Baycor International [online], May 16, 2014, retrieved on Oct. 10, 2015 from the Internet at: <http://web.archive.org/web20140516212533/http://baycorinternational.com/>, p. 3.

*Primary Examiner* — Kipp Wallace
(74) *Attorney, Agent, or Firm* — Lloyd L. Davis; Andrews Kurth Kenyon LLP

(57) ABSTRACT

A tilt mechanism for manipulating an injector head mounted on a tiltable platform attached at one end to a pivot mount on a base structure includes an articulated member attached between the tiltable platform and the base structure, the articulated member having a joint and a cylinder attached between the base structure and the articulated member, wherein an arm of the cylinder is extended to push the joint of the articulated member to an over-center position, thereby locking the articulated member.

12 Claims, 3 Drawing Sheets

(56) References Cited

U.S. PATENT DOCUMENTS

| | | | |
|---|---|---|---|
| RE43,410 E | 5/2012 | Goode | |
| 8,371,074 B2* | 2/2013 | Grant | B66F 1/025 52/116 |
| 2002/0000332 A1* | 1/2002 | Merecka | E21B 7/04 175/73 |
| 2004/0156706 A1 | 8/2004 | Weller et al. | |
| 2005/0247456 A1* | 11/2005 | Wise | E21B 19/22 166/384 |
| 2006/0289171 A1* | 12/2006 | Wood | E21B 19/22 166/380 |
| 2007/0187108 A1* | 8/2007 | Zheng | E21B 19/22 166/354 |
| 2007/0209791 A1* | 9/2007 | Havinga | E21B 7/02 166/77.2 |
| 2007/0295497 A1* | 12/2007 | Pleskie | E21B 7/023 166/77.2 |
| 2008/0296013 A1 | 12/2008 | Pleskie | |
| 2009/0218138 A1* | 9/2009 | Donnally | E21B 15/00 175/57 |
| 2013/0056276 A1 | 3/2013 | Rousseau et al. | |

\* cited by examiner

INJECTOR HEAD TILT MECHANISM

FIELD

Embodiments disclosed herein relate to a coiled tubing unit, more particularly, an injector head tilt mechanism.

BACKGROUND AND SUMMARY

The main engine of a coiled tubing unit is the injector head. This component contains the mechanism to push and pull the coiled tubing in and out of the hole.

In one aspect, embodiments disclosed herein relate to an injector head mounted on a tiltable platform attached at one end to a pivot mount on a base structure, and a tilt mechanism for manipulating the tiltable platform, the tilt mechanism including an articulated member attached between the tiltable platform and the base structure, the articulated member having a joint and a cylinder attached between the base structure and the articulated member, wherein an arm of the cylinder is extended to push the joint of the articulated member to an over-center position, thereby locking the articulated member.

In other aspects, embodiments disclosed herein relate to a method of manipulating a tiltable platform on which an injector head is mounted, the tiltable platform pivotally connected at one end to a base structure, the method including attaching an articulated member having a joint between the tiltable platform and the base structure, attaching a cylinder between the base structure and the articulated member, and extending an arm of the cylinder, thereby pushing the joint of the articulated member to an over-center position, thereby locking the articulated member.

In yet other aspects, embodiments disclosed herein relate to a coiled tubing unit including an injector head mounted on a tiltable platform attached at one end to a pivot mount on a base structure, and a tilt mechanism for manipulating the tiltable platform. The tilt mechanism includes an articulated member attached between the tiltable platform and the base structure, the articulated member having a joint and a cylinder attached between the base structure and the articulated member, wherein an arm of the cylinder is extended to push the joint of the articulated member to an over-center position, thereby locking the articulated member.

BRIEF DESCRIPTION OF THE DRAWINGS

The invention is illustrated in the accompanying drawings wherein.

DETAILED DESCRIPTION

Figure 1:
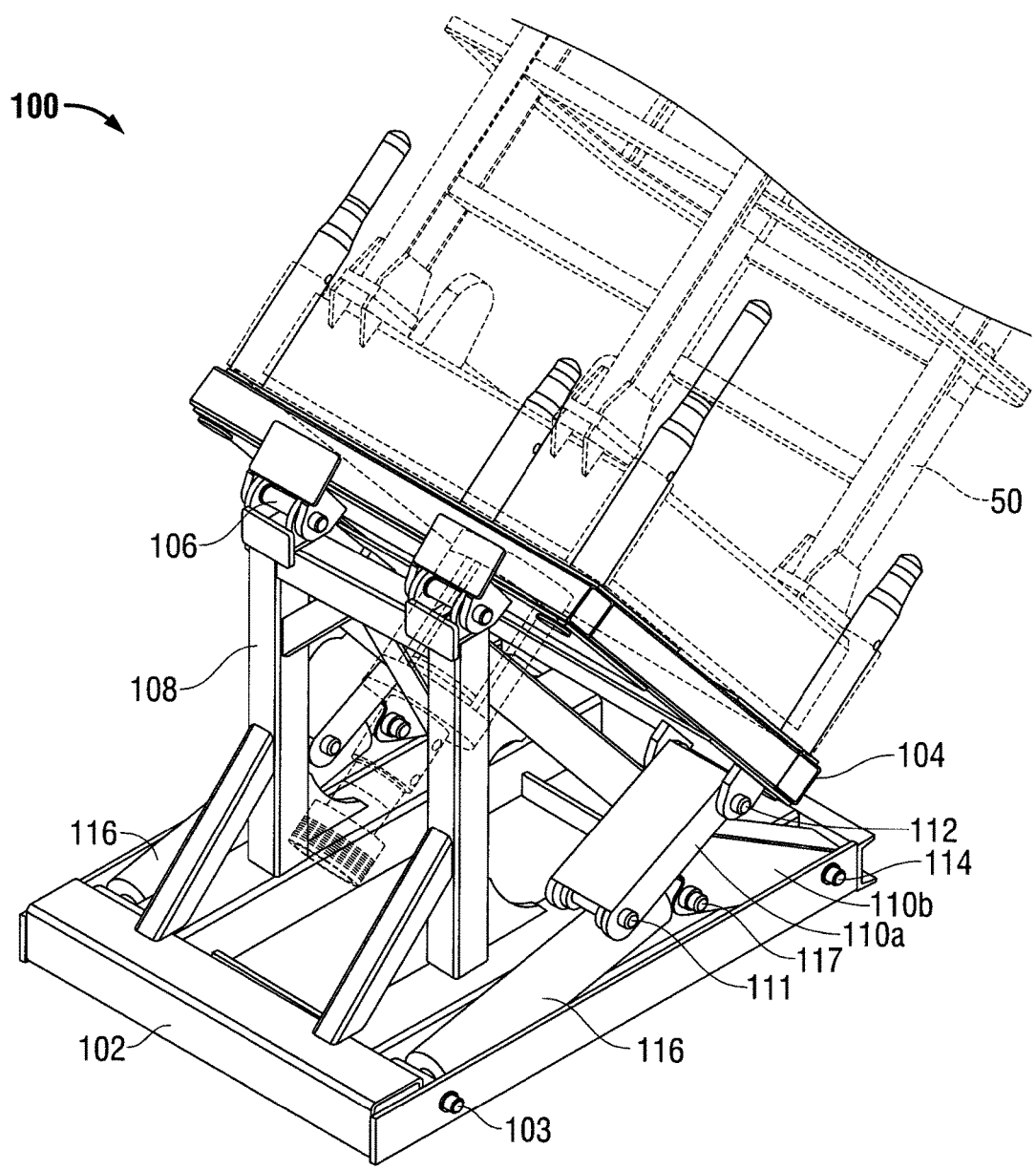
FIG. 1 illustrates a perspective view of an embodiment of an injector head tilt mechanism in a collapsed position.

An injector head tilt mechanism and method for raising an injector head is disclosed. The injector head tilt mechanism may be on a coiled tubing unit. The coiled tubing unit may include a complete set of equipment necessary to perform standard continuous-length tubing operations in the field. For example, the coiled tubing unit may comprise a reel for storage and transport of coiled tubing, an injector head to provide surface drive force to run and retrieve coiled tubing, a control cabin from which an equipment operator may monitor and control the coiled tubing, and a power pack to generate hydraulic and pneumatic power required to operate the coiled tubing unit. The coiled tubing units may further comprise other equipment for continuous-length or coiled tubing operations in the field. Moreover, in certain embodiments the coiled tubing unit may comprise onshore coiled tubing units such as a truck mounted coiled tubing unit or larger trailer mounted coiled tubing units. Still further, in other embodiments the coiled tubing unit may comprise offshore coiled tubing units such as those mounted on a lift boat, barge, offshore platform or any other offshore structure.

An injector head may be mounted on a tiltable platform above a substantially horizontal base structure. Typically, the base structure may be mounted on a truck or trailer. One end of the tiltable platform is attached to the base structure at a pivot mount, e.g., pinned or otherwise. The tilt mechanism disclosed herein manipulates the tiltable platform relative to the base structure to raise and lower the injector head for use or transport. The tilt mechanism includes an articulated member and at least one extendable cylinder. One or more cylinders extend to push a joint of the articulated member to an over-center position, thereby locking the articulated member. In the event hydraulic cylinders are used, this allows the articulated member to substantially fully support the load without the need for hydraulic pressure in the cylinders. Thus, a loss of hydraulic power may not adversely affect the system.

The tilt mechanism may include an articulated member. The articulated member may have a joint coupling first and second arms of the member. For example, the joint may include a pin inserted through holes in the arms of the articulated member, or any other type of joint. The first arm may be connected to a pivot point (e.g., pinned or otherwise) on the tiltable platform at an end opposite the joint. The second arm may be connected to a pivot point (e.g., pinned or otherwise) on the base structure at an end opposite the joint.

The tilt mechanism further includes a cylinder having an extendable arm. The cylinder may be attached between the base structure and the articulated member. For example, the cylinder may be attached at a pivot point (e.g., pinned or otherwise) of the base structure and a pivot point (e.g., pinned or otherwise) on the second arm of the articulated member. Alternatively, the cylinder could be attached at a pivot point (not shown) on the first arm. In one embodiment, the cylinder may be a hydraulic cylinder in fluid communication at any pressure with a hydraulic fluid source. In other embodiments, the cylinder may be pneumatic or electric. In yet other embodiments, the cylinder may be mechanical. The tilt mechanism may include one or more extendable cylinders and articulated members on each side of the injector head.

Figure 2:
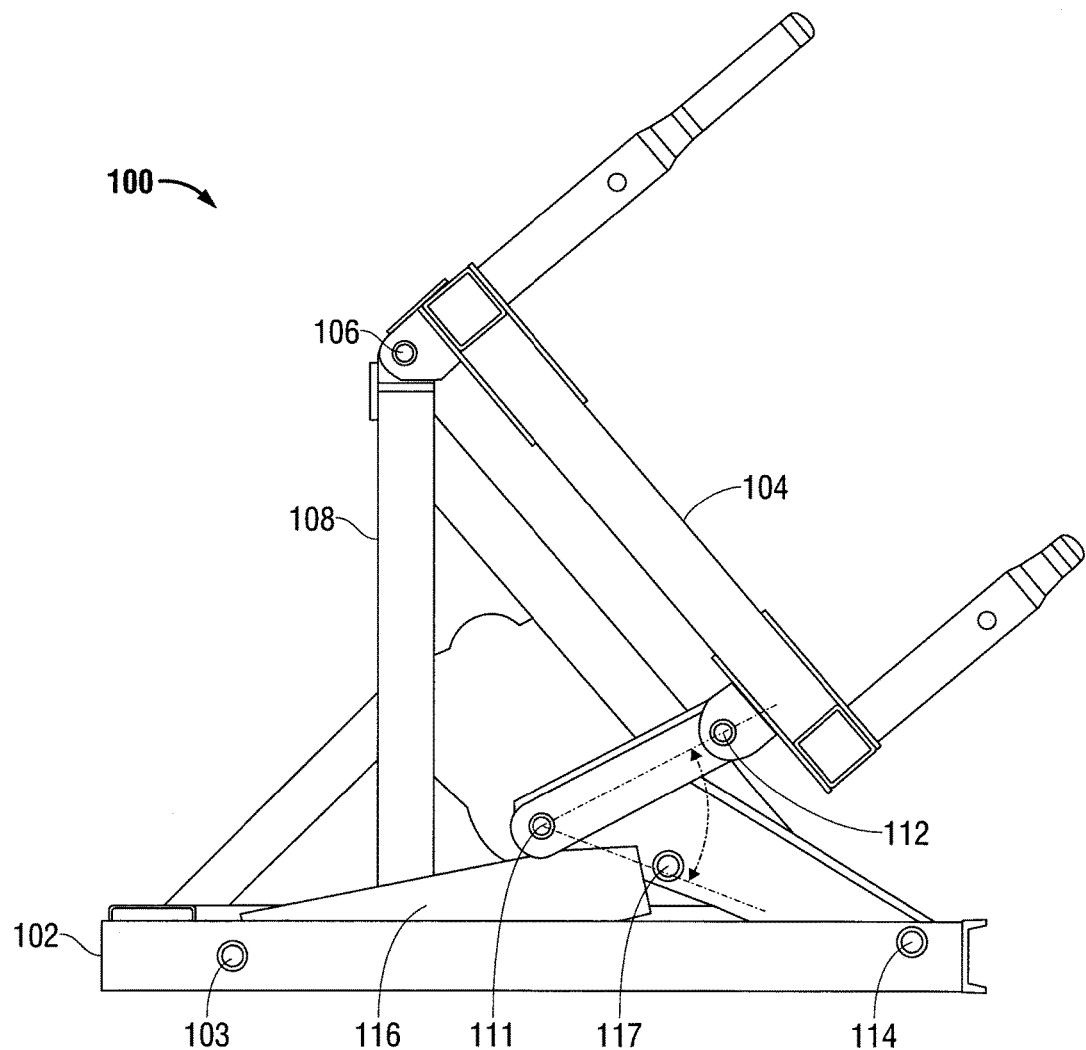
FIG. 2 illustrates a side view of the injector head tilt mechanism of FIG. 1.
Figure 3:
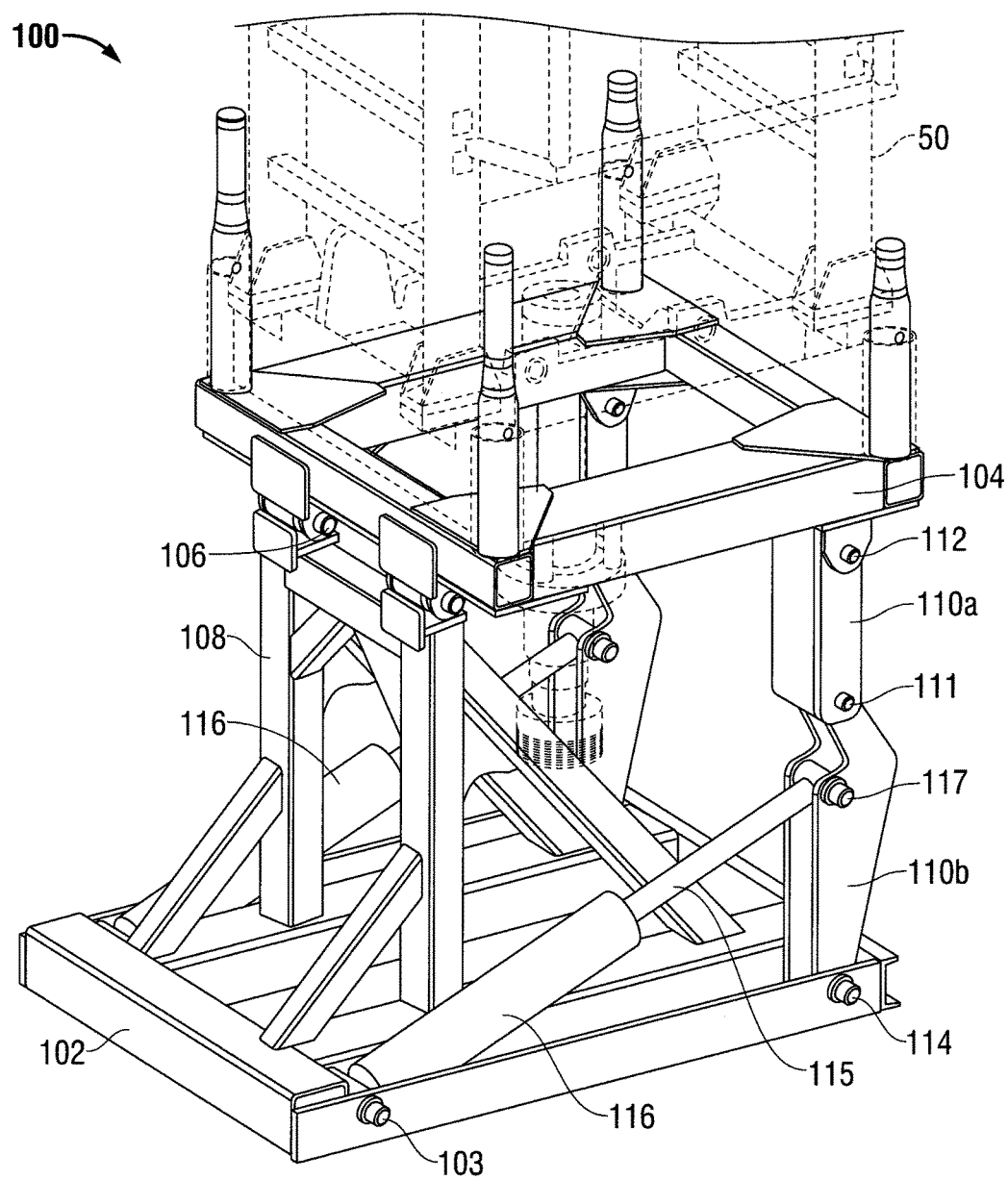
FIG. 3 illustrates a perspective view of an embodiment of an injector head tilt mechanism in an extended position.

FIGS. 1-3 illustrate an embodiment of an injector head tilt mechanism 100. An injector head 50 is mounted on a tiltable platform 104 by any means. The tiltable platform 104 is attached at one end to a pivot point 106, e.g. pinned or otherwise. The pivot point 106 may be located on the distal end of a rigid structure 108 extending upward from a substantially horizontal base structure 102. The base structure 102 may be mounted on a truck or trailer. The base structure 102 may be a commonly known weldment.

The tilt mechanism 100 includes an articulated member 110. The articulated member 110 has a joint 111 coupling first and second arms (110a, 110b) of the member 110. For example, the joint 111 may include a pin inserted through holes in the arms of the articulated member 110, or any other type of joint. The first arm 110a is connected to a pivot point 112 (e.g., pinned or otherwise) on the tiltable platform 104 at an end opposite the joint 111. The second arm 110b is connected to a pivot point 114 (e.g., pinned or otherwise) on the base structure 102 at an end opposite the joint 111.

The tilt mechanism 100 further includes a cylinder 116 having an extendable arm 115. The cylinder 116 may be attached between the base structure 102 and the articulated member 110. For example, the cylinder 116 may be attached at a pivot point 103 (e.g., pinned or otherwise) of the base structure 102 and a pivot point 117 (e.g., pinned or otherwise) on the second arm 110b of the articulated member 110. Alternatively, the cylinder 116 could be attached at a pivot point (not shown) on the first arm 110a. In one embodiment, the cylinder 116 may be a hydraulic cylinder in fluid communication at any pressure with a hydraulic fluid source. In other embodiments, the cylinder 116 may be pneumatic or electric. In yet other embodiments, the cylinder 116 may be mechanical. The tilt mechanism 100 may include one or more extendable cylinders and articulated members on each side of the injector head.

During transport or at other times of nonuse, the injector tilt mount 100 is in the collapsed position (shown in FIG. 1) where the injector head 50 is tilted at an angle, that is, a longitudinal axis of the injector head 50 is not vertical. During use, the injector tilt mount 100 is in the extended position where the longitudinal axis of the injector head 50 is substantially vertical. Methods of using the injector tilt mount include raising the injector head from a collapsed position to an extended position for use, and then lowering the injector head from the extended position to the collapsed position for storage or transport.

To raise the injector head to an extended position (shown in FIG. 3), the cylinders 116 are actuated to extend a cylinder arms 115. The cylinder arms 115 push each respective articulated member 110 near the joint 111 which straightens each articulated member 110 and raises an end of the tiltable platform 104, and accordingly, the injector head 50. Joints 111 of each articulated member 110 are pushed to an over-center position, that is, where the first arm 110a and second arm 110b effectively form a rigid member. In a fully extended position, the articulated member is locked and the injector head 50 and tiltable platform 104 do not rest on the cylinders. In the event that the cylinders are hydraulic and communicating with a hydraulic fluid source, the injector head 50 and tiltable platform 104 do not rest on the hydraulic system, that is, they do not exert back pressure on the hydraulic system because the articulated member is locked. To lower the injector head, the cylinder arms are retracted.

The first arm 110a and second arm 110b of the articulated member 110 are configured to be moved to an over-center position in an extended position of the tilt mechanism. Initially, in a collapsed position, the first arm 110a and second arm 110b may form an acute angle α. In an extended position, the first arm 110a and second arm 110b may form an obtuse angle α, or an angle α greater than an obtuse angle. As used herein, an "over-center" position may be angle α substantially equal to or greater than 180 degrees. In certain embodiments, the first arm 110a and second arm 110b may engage each other in an extended position, thereby locking the articulated member 110.

In other embodiments, one or more cylinders may be attached to the tiltable platform so that the cylinders push on the tiltable platform. When the cylinder is fully extended it may be mechanically locked by any means. In yet other embodiments, when the cylinder is fully extended other mechanical safety locks may be manually or automatically raised into position to support the tiltable platform.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. An injector head mounted on a platform attached at one end to a pivot mount on a base structure, and a mechanism for tilting the platform, the mechanism comprising:
   an articulated member comprising a joint coupling a first movable arm and a second movable arm, wherein the articulated member is attached between the platform and the base structure; and
   a cylinder attached between the base structure and the articulated member,
   wherein an arm of the cylinder is extended to push the joint of the articulated member and thereby move the first and second movable arms and the joint to an over-center position, thereby locking the platform in a position at which a longitudinal axis of the injector head is vertical for carrying out coiled tubing operations.

2. The mechanism of claim 1, wherein the cylinder is hydraulic.

3. The mechanism of claim 2, wherein there is substantially no backpressure on the hydraulic cylinder when the longitudinal axis of the injector head is vertical for carrying out coiled tubing operations.

4. The mechanism of claim 1, wherein an angle between the first and second movable arms of the articulated member is substantially equal to or greater than 180 degrees when the longitudinal axis of the injector head is vertical for carrying out coiled tubing operations.

5. A method of tilting a platform on which an injector head is mounted, the platform pivotally connected at one end to a base structure, the method comprising:
   providing an articulated member comprising a joint coupling a first movable arm and a second movable arm;
   attaching the articulated member between the platform and the base structure;
   attaching a cylinder between the base structure and the articulated member;
   extending an arm of the cylinder, thereby pushing the joint of the articulated member and moving the first and second movable arms and the joint to an over-center position; thereby
   locking the platform in a position at which the longitudinal axis of the injector head is vertical for carrying out coiled tubing operations.

6. The method of claim 5, further comprising creating an angle between the first and second movable arms of the articulated member substantially equal to or greater than 180 degrees when the longitudinal axis of the injector head is vertical for carrying out coiled tubing operations.

7. The method of claim 5, further comprising retracting the arm of the cylinder and moving the platform to a position at which the longitudinal axis of the injector head is not vertical.

8. The method of claim 5, wherein the cylinder is hydraulic, and further comprising locking the articulated member in a manner in which there is substantially no back pressure on the hydraulic cylinder.

9. A coiled tubing unit comprising:
- an injector head mounted on a platform attached at one end to a pivot mount on a base structure; and
- a mechanism for tilting the platform, the mechanism comprising:
- an articulated member comprising a joint coupling a first movable arm and a second movable arm, wherein the articulated member is attached between the platform and the base structure; and
- a cylinder attached between the base structure and the articulated member,
- wherein an arm of the cylinder is extended to push the joint of the articulated member and thereby move the first and second movable arms and the joint to an over-center position, thereby locking the platform in a position at which a longitudinal axis of the injector head is vertical for carrying out coiled tubing operations.

10. The coiled tubing unit of claim 9, wherein the cylinder is hydraulic.

11. The coiled tubing unit of claim 10, wherein there is substantially no backpressure on the hydraulic cylinder when the longitudinal axis of the injector head is vertical for carrying out coiled tubing operations.

12. The coiled tubing unit of claim 9, wherein an angle between the first and second movable arms of the articulated member is substantially equal to or greater than 180 degrees when the longitudinal axis of the injector head is vertical for carrying out coiled tubing operations.

* * * * *